United States Patent
Jang et al.

(10) Patent No.: US 9,843,991 B2
(45) Date of Patent: Dec. 12, 2017

(54) METHOD AND DEVICE FOR CONTROLLING CELL CONNECTION FROM WIRELESS LAN IN WIRELESS COMMUNICATION SYSTEM AND PROVIDING VALID INFORMATION ON PERIPHERAL WIRELESS LAN ACCESS POINTS

(71) Applicant: Samsung Electronics Co., Ltd., Suwon-si, Gyeonggi-do (KR)

(72) Inventors: Jaehyuk Jang, Suwon-si (KR); Sangbum Kim, Suwon-si (KR); Soenghun Kim, Suwon-si (KR); Wooseong Kim, Gwacheon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 14/769,943

(22) PCT Filed: Feb. 28, 2014

(86) PCT No.: PCT/KR2014/001683
§ 371 (c)(1),
(2) Date: Aug. 24, 2015

(87) PCT Pub. No.: WO2014/133359
PCT Pub. Date: Sep. 4, 2014

(65) Prior Publication Data
US 2016/0014680 A1    Jan. 14, 2016

(30) Foreign Application Priority Data

Feb. 28, 2013  (KR) .................. 10-2013-0021703

(51) Int. Cl.
H04W 48/16    (2009.01)
H04W 48/02    (2009.01)
(Continued)

(52) U.S. Cl.
CPC ........... *H04W 48/16* (2013.01); *H04W 48/02* (2013.01); *H04W 76/02* (2013.01); *H04W 48/06* (2013.01);
(Continued)

(58) Field of Classification Search
None
See application file for complete search history.

(56) References Cited

U.S. PATENT DOCUMENTS

2005/0096072 A1    5/2005  Rahman et al.
2005/0202823 A1    9/2005  Shaheen et al.
(Continued)

FOREIGN PATENT DOCUMENTS

KR    10-2009-0006122 A    1/2009
KR    10-2010-0065388 A    6/2010
(Continued)

*Primary Examiner* — Brian Roberts
(74) *Attorney, Agent, or Firm* — Jefferson IP Law, LLP

(57) ABSTRACT

The present invention provides a method for controlling access of a terminal if the terminal accesses from a wireless LAN network to a mobile communication network, when the mobile communication network (for example, UMTS, LTE and the like) and the wireless LAN network are linked in a wireless communication system. Furthermore, the present invention provides a method for transmitting information on connectable peripheral wireless LAN networks. Thus, the present invention can reduce a load of a network since the network can control the access of a terminal, and can reduce unnecessary power consumption and solve a connection delay problem by providing a valid wireless LAN network list to the terminal.

10 Claims, 10 Drawing Sheets

(51) Int. Cl.
  *H04W 76/02* (2009.01)
  *H04W 48/08* (2009.01)
  *H04W 88/06* (2009.01)
  *H04W 84/12* (2009.01)
  *H04W 48/06* (2009.01)

(52) U.S. Cl.
  CPC ............ *H04W 48/08* (2013.01); *H04W 84/12* (2013.01); *H04W 88/06* (2013.01); *Y02B 60/50* (2013.01)

(56) References Cited

U.S. PATENT DOCUMENTS

| | | | |
|---|---|---|---|
| 2007/0224988 A1* | 9/2007 | Shaheen | H04W 36/0061 455/436 |
| 2010/0323698 A1* | 12/2010 | Rune | H04W 48/06 455/436 |
| 2011/0009126 A1 | 1/2011 | Lee | |
| 2014/0211776 A1 | 7/2014 | Jang et al. | |

FOREIGN PATENT DOCUMENTS

| | | |
|---|---|---|
| KR | 10-2011-0092132 A | 8/2011 |
| KR | 10-2011-0093962 A | 8/2011 |
| KR | 10-2014-0096631 A | 8/2014 |
| WO | 2010/147527 A1 | 12/2010 |

* cited by examiner

METHOD AND DEVICE FOR CONTROLLING CELL CONNECTION FROM WIRELESS LAN IN WIRELESS COMMUNICATION SYSTEM AND PROVIDING VALID INFORMATION ON PERIPHERAL WIRELESS LAN ACCESS POINTS

TECHNICAL FIELD

The present invention relates to a mobile communication network, and more particularly to a method for controlling access of a user equipment when the user equipment operating in a wireless LAN network connects to a 3rd Generation Partnership Project (3GPP) system (e.g., UMTS (Universal Mobile Telecommunications System)) in a system linked to the 3GPP system and an LTE (Long Term Evolution) system and a method for transmitting connectable valid information when a network transmits information on peripheral wireless LAN networks to the user equipment.

BACKGROUND ART

With evolution of technology, UMTS has been introduced as the third generation mobile communication technology, and LTE has come into the spotlight as the fourth generation mobile communication technology.

In addition, with the spread of smartphones, user data capacity has drastically increased, and mobile communication network operators are making efforts to distribute user data in connection with a wireless LAN network as well as legacy mobile communication networks (i.e., 3G and 4G cellular networks) in order to support the drastically increased amount of data.

However, a close link between the cellular networks and the wireless LAN network has not been established yet. In other words, the cellular networks and the wireless LAN network operate independently except for some limited functionality (e.g., authentication).

Thereby, even if switching to a cellular network is not preferable due to high load in the cellular network when a user equipment operating in a wireless LAN desires to re-access the cellular network, the user equipment may attempt to switch to the cellular network without recognizing the load. As a result, the wireless LAN network may fail to properly distribute excessive traffic, and satisfaction of all cellular network users may be degraded due to excessive accesses to the cellular network.

Further, when the user equipment operating in a cellular network desires to switch to a wireless LAN network, the cellular network may transmit information on access points (hereinafter, APs) of a peripheral wireless LAN network to the user equipment. In this case, however, the cellular network may deliver, to user equipments, a list of APs including even APs which do not properly operate, and the user equipments receiving the list may attempt to perform unnecessary scanning and access in order to access an AP that does not properly operate. Thereby, unnecessary power consumption of the user equipments and connection delay may occur.

Accordingly, there is a need for a method to solve the above problems.

DISCLOSURE OF INVENTION

Technical Problem

The present invention is provided to solve the above problems and aims to provide a method for controlling access of a user equipment if the user equipment in a wireless LAN network (IEEE 802.11-based short-range communication technology) connects to a mobile communication network, when a cellular network (e.g., UMTS, LTE, or the like) and the wireless LAN network are linked in a wireless communication system, a method for transmitting information on accessible peripheral wireless LAN networks when the user equipment in the mobile communication network connects to the wireless LAN network, and devices for the same.

Technical Solution

As embodiment 1 of the present invention, provided herein is the following method for controlling access of a user equipment when the user equipment in a wireless LAN network connects to a mobile communication network:
  A base station broadcasts the following parameters through a predetermined system information block (SIB):
    Connection prohibition indication bit (1 bit), when the user equipment desires to connect to a current cell from a wireless LAN;
    Bitmap (10 bits) according to an access class; or
    Bitmap (N bits: each bit represents a service (voice, Internet, etc.)) according to a connection type;
  The user equipment receiving the parameter applies the parameter only when:
    the user equipment is connected to a wireless LAN;
    the wireless LAN intensity of the user equipment is greater than or equal to a predetermined value x in dBm; or
    the user equipment has a "valid" wireless LAN link (namely, when Internet connection is possible);
  When the above conditions are met, access to a cellular network is determined according to the aforementioned parameter.
As embodiment 2 of the present invention, the following method is used for a user equipment to transmit information on connectable peripheral wireless LAN APs in a mobile communication network:
  The user equipment receives a peripheral AP list from a base station, selects an AP in the received AP list, and attempts to connect to the same;
  If the user equipment fails to connect to the AP, the user equipment reports a connection failure AP list (BSSID) to the base station;
  The base station updates the AP list, and if there is a server managing APs, the base station reports malfunctioning APs to the base station;
  (Embodiment 2-1)
    Transmit a connection prohibition list to the user equipment.
    The user equipment does not attempt to connect to corresponding APs.
  (Embodiment 2-2)
    Transmit a preferred connection list and a non-preferred connection list to the user equipment separately when a list of APs in a cell is delivered to the user equipment.
    The user equipment connects to APs in the preferred connection list first.
    If none of the APs in the preferred connection list are connectable, the user equipment attempts to connect to an AP in the non-preferred connection list.
    If connection is successful, the user equipment reports successful connection to the base station such that the list is updated. Additionally, the updated information may be reported to the server.

Specifically, in accordance with an aspect of the present invention, a method for connecting to a cell by a terminal in a wireless communication system is provided. The method may include: determining whether to attempt connection to a mobile communication network during data communication through a wireless local area network (LAN); determining whether to receive a connection restriction parameter from a base station upon determining to attempt connection to the mobile communication network; receiving, upon determining to receive the connection restriction parameter, the connection restriction parameter from the base station and determining whether connection to the base station is allowed, based on the received connection restriction parameter; and attempting to connect to the base station when connection to the base station is allowed.

In accordance with another aspect of the present invention, a method for controlling cell connection of a terminal by a base station in a wireless communication system is provided. The method may include determining whether to control connection of the terminal connected to a wireless local area network (LAN); configuring a connection restriction parameter upon determining to control the connection; and transmitting the configured connection restriction parameter to the terminal.

In accordance with another aspect of the present invention, a terminal connecting to a cell in a wireless communication system is provided. The terminal may include: a wireless local area network (LAN) communication unit to transmit and receive a signal to and from a wireless LAN access point; a transceiver to transmit and receive a signal to and from a base station of a mobile communication system; and a controller to control determining whether to attempt connection to a mobile communication network during data communication through a wireless LAN; determining whether to receive a connection restriction parameter from the base station upon determining to attempt connection to the mobile communication network; receiving, upon determining to receive the connection restriction parameter, the connection restriction parameter from the base station and determining whether connection to the base station is allowed based on the received connection restriction parameter; and attempting to connect to the base station when connection to the base station is allowed.

In accordance with another aspect of the present invention, a base station controlling cell connection of a terminal in a wireless communication system is provided. The base station may include a transceiver to transmit and receive a signal to and from the terminal; and a controller to control: determining whether to control connection of the terminal connected to a wireless local area network (LAN); configuring a connection restriction parameter upon determining to control the connection; and transmitting the configured connection restriction parameter to the terminal.

In accordance with another aspect of the present invention, a method for connecting to a wireless local area network (LAN) access point by a terminal in a wireless communication system is provided. The method may include receiving information on a connectable access point (AP) list from a base station; searching neighboring APs according to the received connectable AP list and transmitting, to the base station, a connection failure list of APs which the terminal has failed to connect to among the searched APs; receiving, from the base station, a connection-related AP list updated based on the connection failure AP list; and attempting to connect to a wireless LAN according to the received connection-related AP list.

In accordance with another aspect of the present invention, a terminal connecting to a wireless local area network (LAN) access point in a wireless communication system is provided. The terminal may include: a wireless LAN communication unit to transmit and receive a signal to and from the wireless LAN access point; a transceiver to transmit and receive a signal to and from a base station of a mobile communication system; and a controller to control: receiving information on a connectable access point (AP) list from the base station; searching neighboring APs according to the received connectable AP list and transmitting, to the base station, a connection failure list of APs to which the terminal has failed to connect among the searched APs; receiving, from the base station, a connection-related AP list updated based on the connection failure AP list; and attempting to connect to the wireless LAN according to the received connection-related AP list.

Advantageous Effects of Invention

With a method proposed in an embodiment of the present invention, a cellular network controls access of a user equipment which attempts to connect to the cellular network from a wireless LAN network, and therefore may be prevented from being overloaded. In addition, as the network delivers a valid wireless LAN AP list to user equipments, unnecessary power consumption of the user equipments and connection delay may be prevented.

MODE FOR THE INVENTION

Detailed descriptions of well-known functions and structures incorporated herein may be omitted to avoid obscuring the subject matter of the present invention. Hereinafter, various embodiments of the present invention are described in detail with reference to the accompanying drawings.

For simplicity, description will be given focusing on an LTE system as an example of a cellular network. The description may also be applied other cellular networks (e.g., UMTS).

Figure 1:
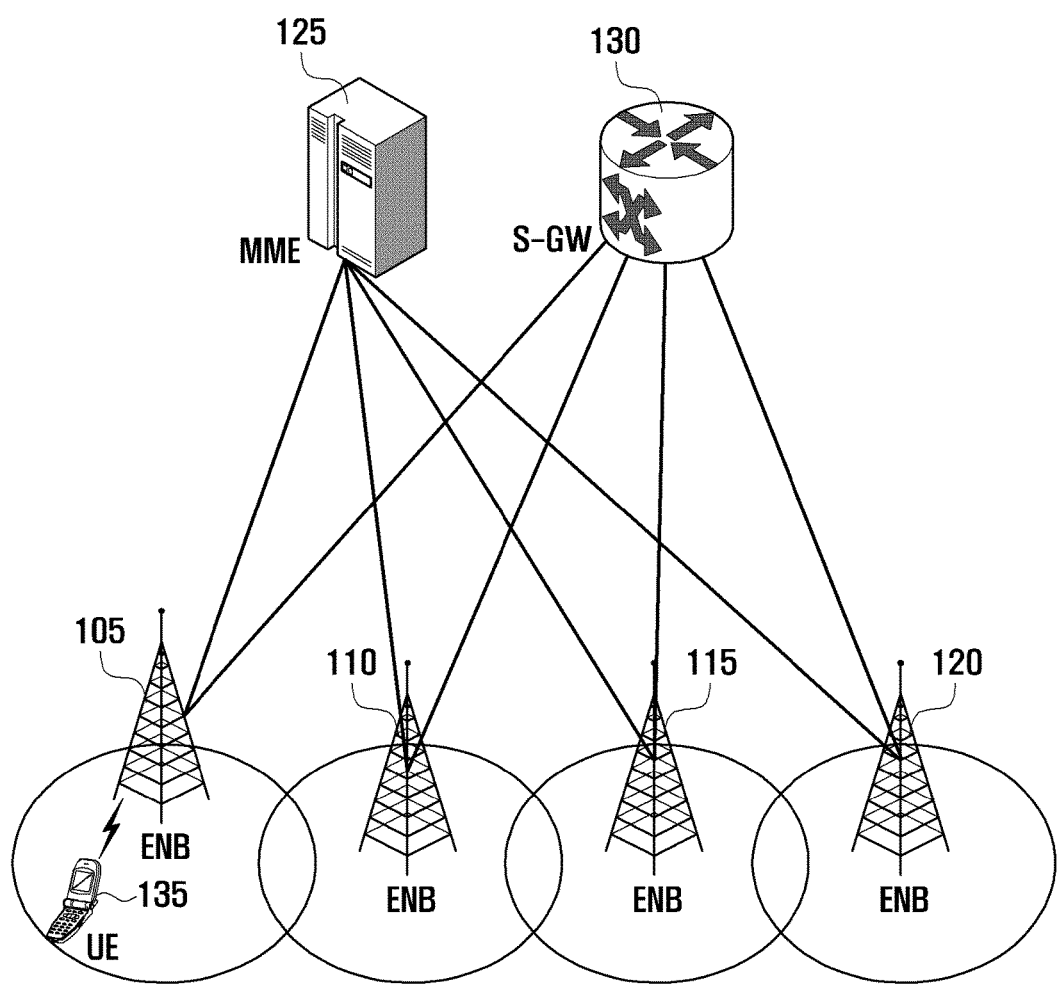
FIG. 1 illustrates the structure of an LTE system to which the present invention is applied.

FIG. 1 illustrates the structure of an LTE system to which the present invention is applied.

Referring to FIG. 1, the wireless access network of the LTE system includes evolved Node Bs 105, 110, 115 and 120 (hereinafter, base stations, Node Bs or base stations) and a mobility management entity (MME) 125, and a serving gateway (S-GW) 130. A user equipment 135 (hereinafter, UE or terminal) connects to an external network via base stations 105, 110, 115 and 120 and the S-GW 130.

In FIG. 1, the base stations 105, 110, 115 and 120 correspond to conventional node Bs of the UMTS system. The base stations are connected to the UE 135 via a wireless channel and perform more complex functions than the conventional node Bs. In the LTE system, all user traffic including real-time services such as VoIP (Voice over IP) using the Internet protocol is provided over a shared channel. Accordingly, a device to perform scheduling by collecting status information on UEs such as buffer status, available transmit power status and channel status is needed, and the base stations 105, 110, 115 and 120 serve as this device. In general, one base station controls multiple cells. In order to achieve a transfer rate of 100 Mbps, the LTE system uses, for example, orthogonal frequency division multiplexing (hereinafter, OFDM) in the bandwidth of 20 MHz as wireless access technology. In addition, an adaptive modulation and coding scheme (hereinafter, AMC) is applied to determine a modulation scheme and a channel coding rate according to the channel status of the UE. The S-GW 130, which is a device to provide data bearers, is controlled by the MME 125 to generate or delete data bearers. The MME, which is responsible for various control functions including mobility management, connects to multiple base stations.

Figure 2:
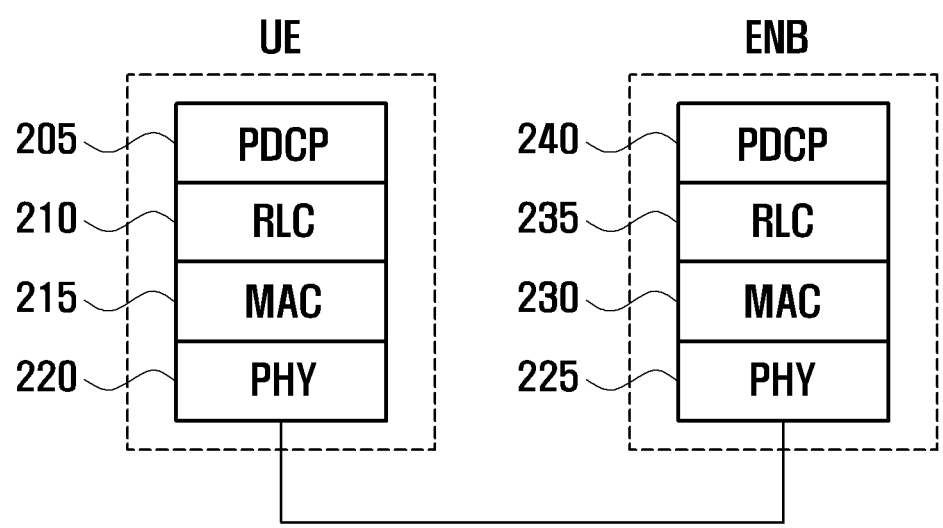
FIG. 2 illustrates a wireless protocol architecture in an LTE system to which the present invention is applied.

FIG. 2 illustrates a wireless protocol architecture in an LTE system to which the present invention is applied.

Referring to FIG. 2, the wireless protocol of the LTE system includes a packet data convergence protocol (PDCP) 205, 240, a radio link control (RLC) layer 210, 235, and a medium access control (MAC) layer 215, 230 for a UE and a base station, respectively. The PDCP 205, 240 is responsible for operations such as IP header compression/restoration, and the RLC 210, 235 reconfigures a PDCP packet data unit (PDU) in a proper size. The MAC 215, 230 connects to several RLC layer devices configured in a UE, and performs operations of multiplexing RLC PDUs in a MAC PDU and demultiplexing the RLC PDUs from the MAC PDU. A physical layer (PHY) 220, 225 creates OFDM symbols from higher layer data by channel-coding and modulating the data and transmitting the same over a wireless channel, or demodulates and channel-decodes OFDM symbols received over the wireless channel and delivers the same to a higher layer. The PHY also uses Hybrid ARQ (HARQ) to implement additional error correction, and the reception end transmits 1-bit information indicating whether or not the reception end has received a packet transmitted from the transmission end. This information is called HARQ ACK/NACK information. The downlink HARQ ACK/NACK information for uplink transmission may be transmitted over a physical hybrid-ARQ indicator channel (PHICH), and the uplink HARQ ACK/NACK information for downlink transmission may be transmitted over a physical uplink control channel or a physical uplink shared channel (PUSCH).

As mentioned above, when a UE operating in a wireless LAN desires to re-connect to a cellular network, a method to control this operation is needed. In addition, when a UE operating in a cellular network desires to shift to a wireless LAN network, a method to link the cellular network such as LTE to the wireless LAN network is needed in order for the UE to manage valid power consumption and network load.

Figure 3:
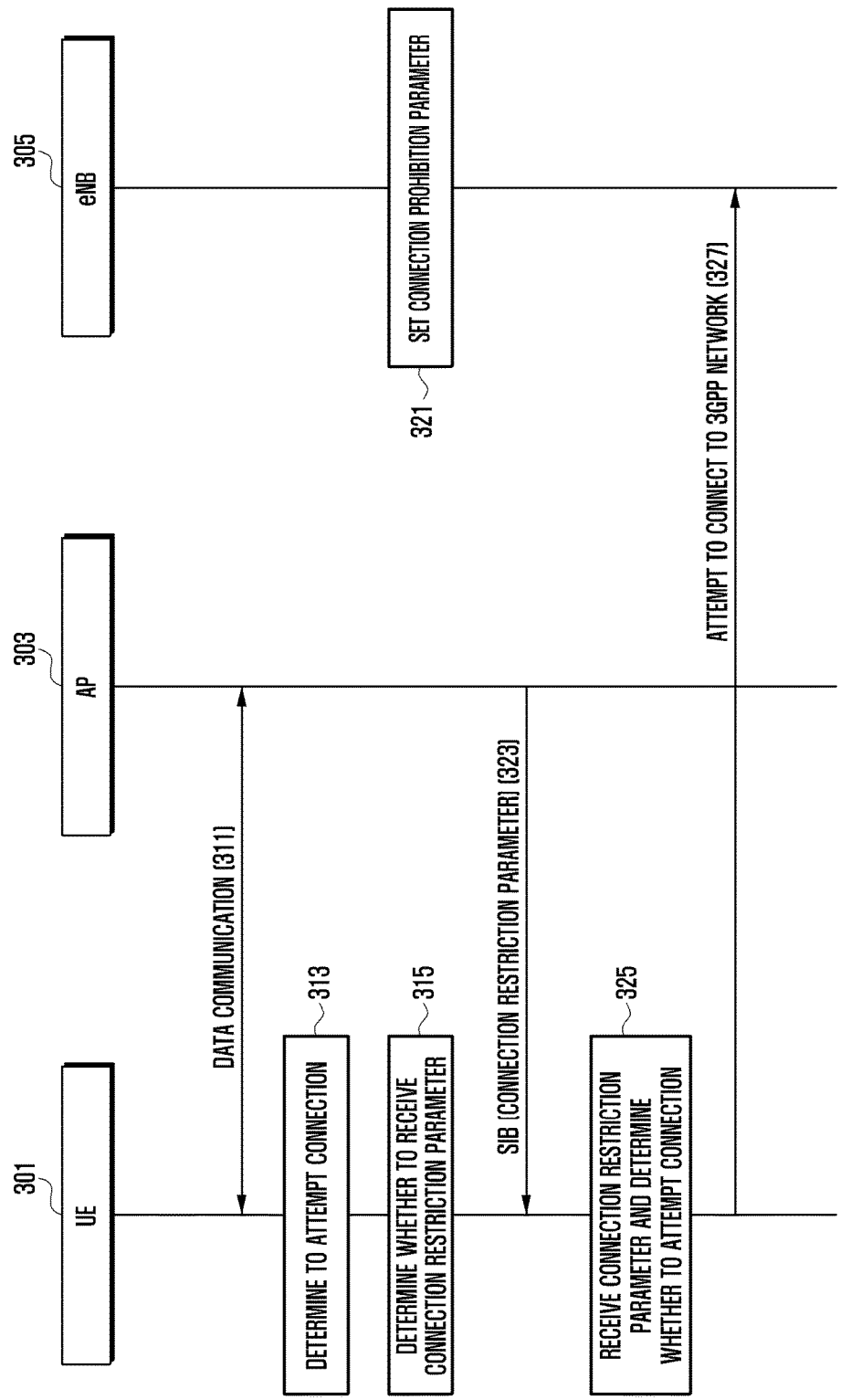
FIG. 3 is a flowchart illustrating a procedure of transmission and reception of a message between a user equipment and a base station according to a first embodiment of the present invention.

FIG. 3 is a flowchart illustrating a procedure of transmission and reception of a message between a UE and a base station according to a first embodiment of the present invention.

In FIG. 3, a UE 301 exchanges data with a wireless LAN AP 303 (311). It is assumed that the UE 301 is operating in an idle mode in the 3GPP network and there is no valid link to the 3GPP network. Herein, the assumption that there is no valid link means that the UE 301 substantially neither transmits nor receives data through the 3GPP network.

Thereafter, the UE determines to attempt to connect to a base station 305 of the 3GPP network according to a request from a user (313).

Meanwhile, in order to prevent reckless connection to the 3GPP base station when data communication can be sufficiently performed in the wireless LAN, the base station sets at least one of the following parameters (321), and broadcasts the same predetermined through an SIB in a cell (323):

Connection prohibition indication bit (1 bit), when a UE desires to connect to a current cell from the wireless LAN
  If the prohibition indication bit is set, access of a UE which can perform data communication in the wireless LAN is prohibited;
Bitmap (10 bits) according to an access class of the UE
  In the 3GPP system, a Universal Subscriber Identity Module (USIM) card is provided to (installed at) a UE, and access classes 0 to 9 are arbitrarily stored in each USIM card. Accordingly, if any three bits (e.g., bits 1, 4 and 8) in a bitmap according to an access class are set to 1, and the access class stored in the USIM card of the UE coincides with the preset class (e.g., class 4), connection of the UE is prohibited. That is, if 3 of the 10 bits are set to 1, 30% of connection from UEs may be blocked in terms of probability. The blocking rate may be increased by setting more bits to 1;
Bitmap (N bits: each bit represents a service (voice call, video call, Internet, etc.)) according to a connection type of the UE;
  The bitmap according to the connection type may control connection of the UE according to the connection type when the UE desires to connect to the 3GPP network. In this embodiment, when the UE desires to implement a voice call or video call during communication in the wireless LAN, connection thereof is allowed. However, if the UE desires to perform typical Internet communication, the bitmap may be used when connection of the UE needs to be restricted. For example, when it is desired to distinguish among an outgoing voice call, an outgoing video call, and Internet communication, 3 bits may be used. In this case, a bit for the outgoing voice call and a bit for outgoing video call may be set to 1 and a bit for Internet communication may be set to 0. Thereby, allowed connection may be indicated by 1 and prohibited connection may be indicated by 0. Alternatively, connection may be indicated by 1, and allowed connection may be indicated by 0.

Meanwhile, a UE having determined to attempt the connection determines whether to receive the set parameter (315) if:
the UE is connected to the wireless LAN;
the wireless LAN intensity of the UE is greater than or equal to predetermined x dBm (i.e., a preset reference intensity); or
the UE has a "valid" wireless LAN link
This means that the UE is allowed to not only connect to the wireless LAN but also to the Internet. If the UE is allowed to connect to the wireless LAN, but connection to the Internet does not actually work, this is intended to prevent the UE from failing to connect to the 3GPP network due to the connection restriction parameter.

Examining the conditions as above is intended to prevent communication of the UE from being disabled, which occurs when the UE cannot perform communication in the wireless LAN and even connection to the 3GPP network is restricted. That is, this invention is intended to prevent a UE allowed to perform communication over the wireless LAN from unnecessarily shifting to the 3GPP network to perform communication.

When the above conditions are met, the UE receives the connection restriction parameter and determines whether or not the parameter is applied to the UE, thereby determining whether or not to attempt to connect to the 3GPP network (325). If it is determined that the connection is allowed, the UE attempts to connect to the 3GPP eNB (327). Otherwise, the UE does not attempt connection and maintains communication with a wireless LAN AP.

Figure 4:
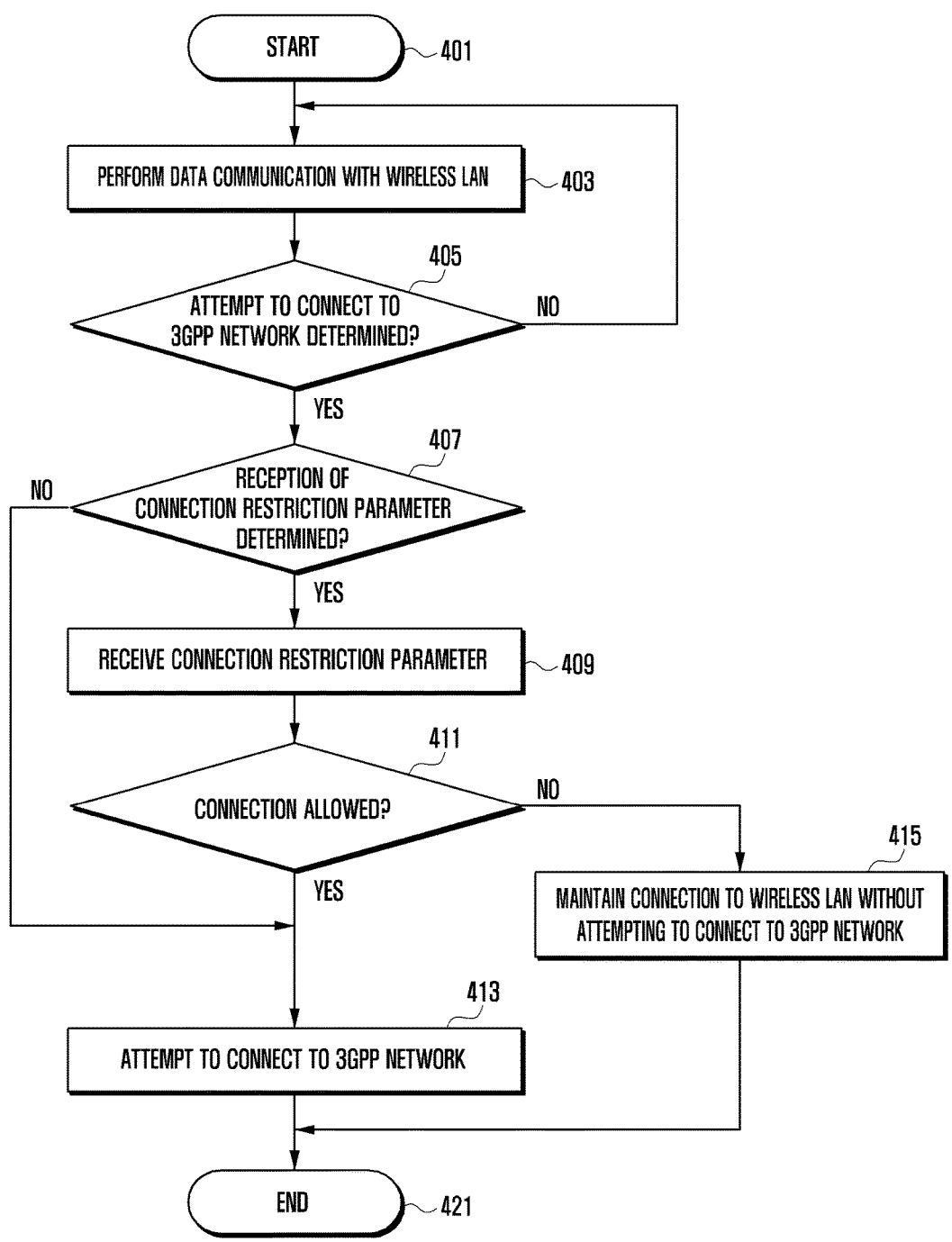
FIG. 4 is a flowchart illustrating an operational procedure of the user equipment according to the first embodiment of the present invention.

FIG. 4 is a flowchart illustrating an operational procedure of the UE according to the first embodiment of the present invention.

The UE performs data communication with the wireless LAN AP 303 (403), and it is assumed that the UE operates in the idle mode in the 3GPP network. Thereafter, when the UE determines to attempt to connect to the 3GPP network according to decision of the user (405), the UE checks if the following conditions are met, and determines whether to receive a connection restriction parameter from the base station (407):
the UE is already connected to the wireless LAN;
the wireless LAN intensity of the UE is greater than or equal to a predetermined value x in dBm; or
the UE has a "valid" wireless LAN link
This means that the UE is allowed to not only connect to the wireless LAN but also to the Internet. If the UE is allowed to connect to the wireless LAN, but connection to the Internet does not actually work, this is intended to prevent the UE from failing to connect to the 3GPP network due to the connection restriction parameter.

Examining the above conditions is intended to prevent communication of the UE from being disabled, which occurs when the UE cannot perform communication in the wireless LAN and even connection to the 3GPP network is restricted.

Only when the above conditions are met, can the UE receive the connection restriction parameter from the base station (409). Thereafter, the UE determines whether or not connection of the UE is allowed, based on the value of the received connection restriction parameter (411).

If it is determined that connection is allowed, the UE attempts to connect to the 3GPP base station (413). If connection is not allowed, the UE does not attempt to connect to the 3GPP base station, but maintains connection to the wireless LAN and performs communication with the wireless LAN (415).

Figure 5:
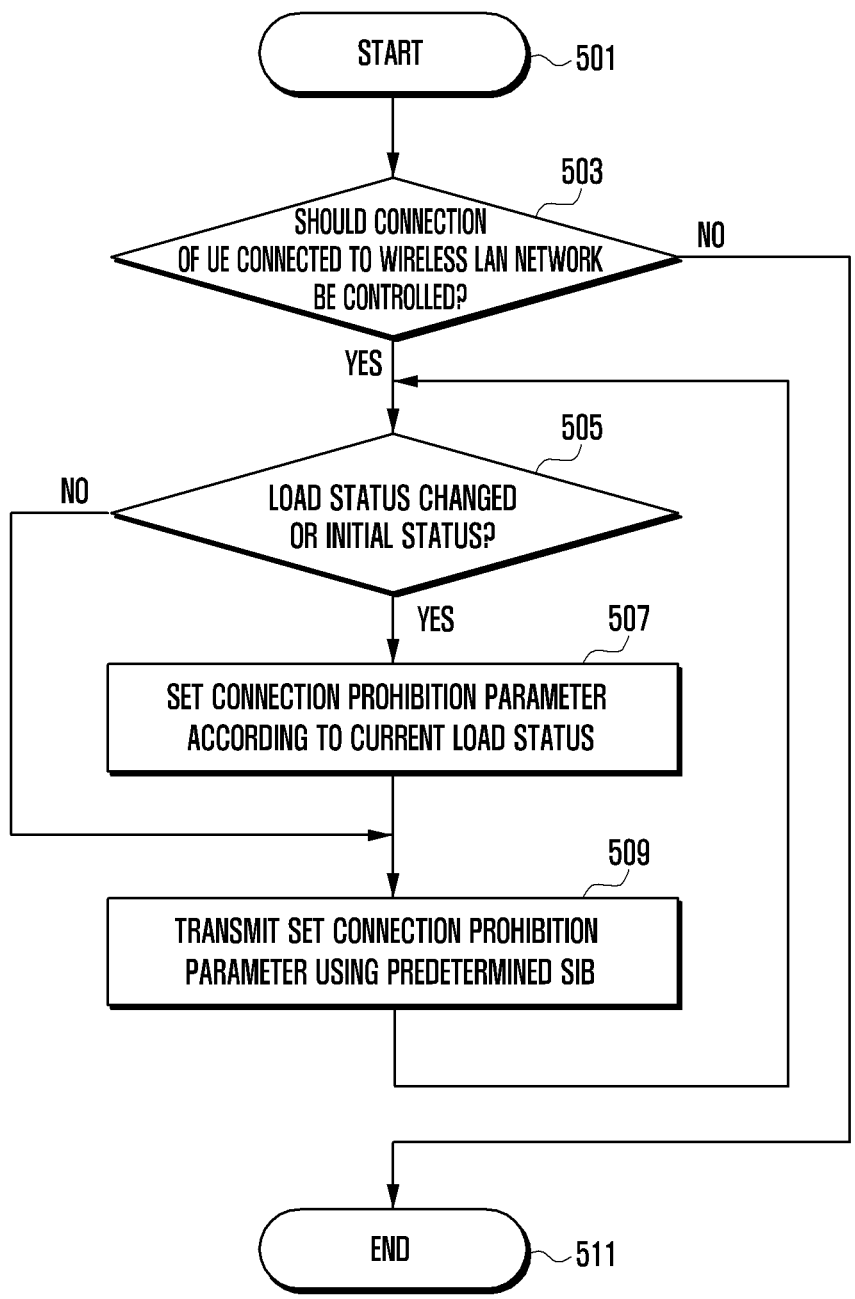
FIG. 5 is a flowchart illustrating an operational procedure of the base station according to the first embodiment of the present invention.

FIG. 5 is a flowchart illustrating an operational procedure of the base station according to the first embodiment of the present invention.

The base station determines whether to control connection of a UE connected to the wireless LAN network (503). When the base station desires to control connection of the UE connected to the wireless LAN network, the base station determines if there is a previously set connection restriction parameter value, and if there is a previously set connection restriction parameter value, the base station determines whether the current load on the base station requires the connection restriction parameter to be changed (505).

If there is no previously set connection restriction parameter value, or a previously set connection restriction parameter value needs to be changed, the base station sets a value of the connection restriction parameter using at least one of the following methods (507):
Setting a connection prohibition indication bit (1 bit) when the UE desires to connect to the current cell from the wireless LAN
If the prohibition indication bit is set, connection of a UE allowed to perform data communication in the wireless LAN is prohibited;
Setting a bitmap (10 bits) according to the access class of the UE
In the 3GPP system, a USIM card is provided to a UE, and access classes 0 to 9 are arbitrarily stored in each USIM card. Accordingly, if any three bits (e.g., bits 1, 4 and 8) in a bitmap according to an access class are set to 1, and the access class stored in the USIM card of the UE coincides with the preset class (e.g., class 4), connection of the UE is prohibited. That is, if 3 of the 10 bits are set to 1, 30% of connection from UEs may be blocked in terms of probability. The blocking rate may be increased by setting more bits to 1;
Setting a bitmap (N bits: each bit represents a service (voice call, video call, Internet, etc.)) according to a connection type of the UE;
The bitmap according to the connection type may control connection of the UE according to the connection type when the UE desires to connect to the 3GPP network. In this embodiment, when the UE desires to implement a voice call or video call during communication in the wireless LAN, connection thereof is allowed. However, if the UE desires to perform general Internet communication, the bitmap may be used when restriction to the connection is desired. For example, when it is desired to distinguish among an outgoing voice call, an outgoing video call, and Internet communication, 3 bits may be used. In this case, a bit for the outgoing voice call and a bit for outgoing video call may be set to 1 and a bit for Internet communication may be set to 0. Thereby, allowed connection may be indicated by 1 and prohibited connection may be indicated by 0. Alternatively, connection may be indicated by 1, and allowed connection may be indicated by 0.

Thereafter, the base station may periodically transmit the set bit or bitmap to UEs in a cell using a predetermined SIB (509), thereby controlling reckless connection of the UEs.

Figure 6:
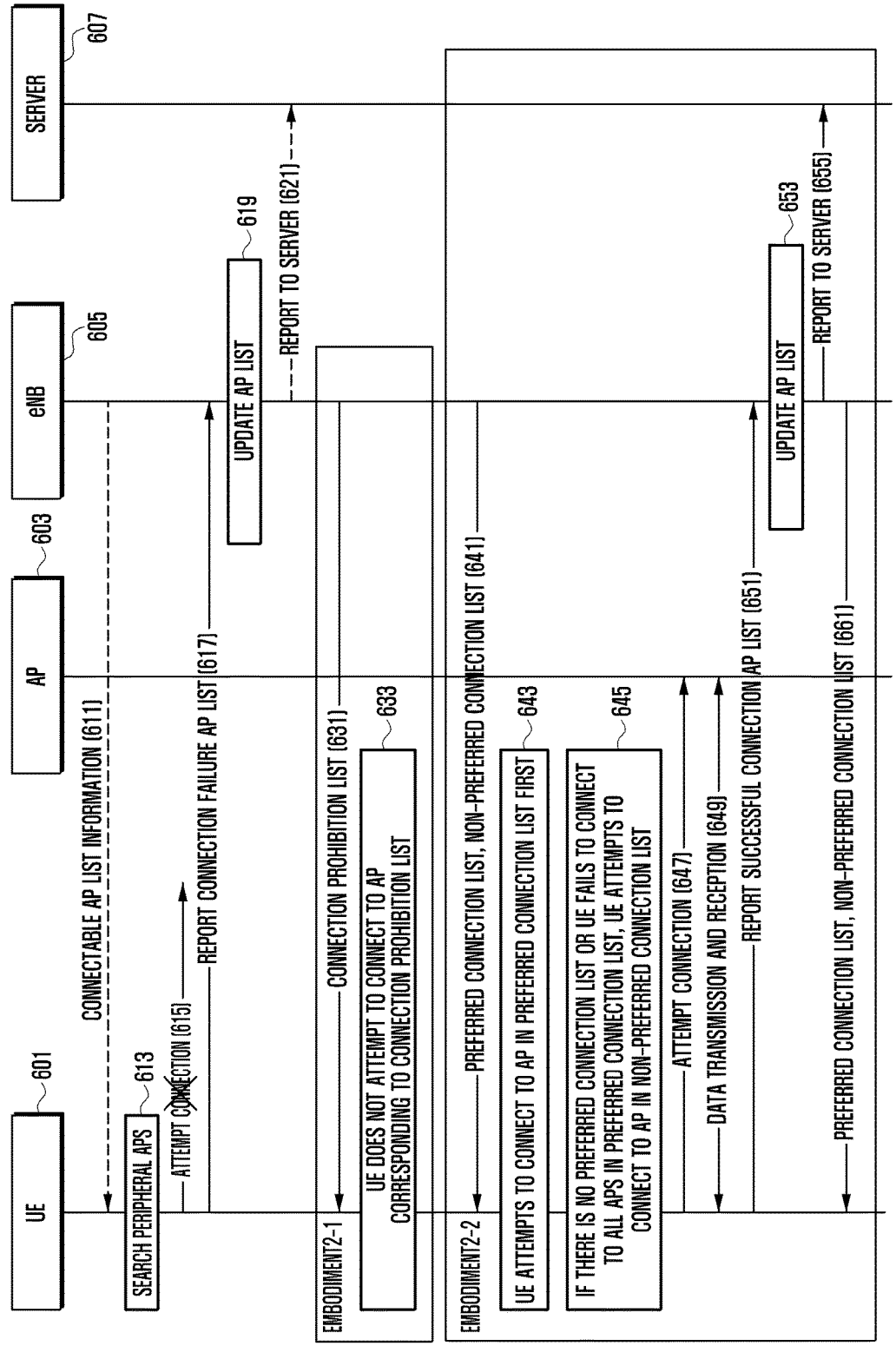
FIG. 6 is a flowchart illustrating a procedure of exchanging a message between a user equipment and a base station according to a second embodiment of the present invention.

FIG. 6 is a flowchart illustrating a procedure of exchanging a message between a UE and a base station according to a second embodiment of the present invention.

In FIG. 6, a UE 601 exchanges data with a 3GPP base station 605 (611), and it is assumed that the UE is operating in a connected mode in the 3GPP network. If possible, the UE receives connectable AP list information from the 3GPP base station (611). The connectable AP list information may be received through a unicast message of a radio resource control (hereinafter, RRC) layer which is transmitted to the UE only, or may be received through an SIB that is broadcast to all UEs in the cell.

If the information can be received, the UE searches limited APs according to the received information. If the information cannot be received, the UE searches APs operating on a searchable channel (613).

Thereafter, the UE attempts to connect to a searched wireless LAN AP 603 (615).

In an embodiment described below, it is assumed that the UE fails to connect to the wireless LAN AP.

According to an embodiment, if a wireless LAN signal is searched, but the UE fails to connect to a wireless LAN AP in the process of actual connection, the UE reports the connection-failed wireless LAN AP list (or connection failure AP list) to the base station (617). The UE performs reporting using an RRC layer message and also using a basic service set identifier (hereinafter, BSSID) to distinguish between APs. The BSSID has a length of 6 bytes, and indicates the address of a media access control (MAC) layer used by respective APs. The BSSID has a globally unique number so as to distinguish a specific AP.

Upon receiving the connection failure AP list transmitted from the UE the base station updates AP lists that the base station manages (619).

Subsequently, if there is a server managing APs, the base station may deliver, to the server 607, the list of improperly operating APs (connection failure AP list) reported from the UE (621).

Thereafter, the base station transmits an updated connection-related AP list to the UE based on the connection failure AP list. The connection-related AP list may be a connection prohibition list or a preferred connection AP list/non-preferred connection AP list.

Hereinafter, description will be given of embodiment 2-1, in which the connection-related AP list is a connection prohibition list and embodiment 2-2, in which the connection-related AP list is a preferred connection AP list/non-preferred connection AP list, respectively.

According to embodiment 2-1, as the AP list is updated (619), the base station separately transmits a list of APs to which connection has failed as a connection prohibition list (631).

Then, the UE receiving this list does not attempt to connect to the APs included in the prohibition list in connecting to the wireless LAN, thereby preventing unnecessary power consumption and connection delay (633). The connection prohibition list may be a unicast message of the RRC layer which is transmitted to the UE only or a message that is broadcast to all UEs in the cell through a predetermined SIB.

According to embodiment 2-2, as the AP list is updated (619), the base station separately transmits a preferred connection AP list and a non-preferred connection AP list (641). The preferred connection AP list and the non-preferred connection AP list may be a unicast message of the RRC layer which is transmitted to the UE only or a message that is broadcast to all UEs in the cell through a predetermined SIB. When a UE receives the message, the UE attempts to connect to an AP included in the preferred connection AP list first (643).

If the AP included in the preferred connection AP list is not around the UE, or connection fails, the UE attempts to connect to an AP included in the non-preferred connection AP list (645). Thereafter, the UE succeeds in connecting to the AP included in the non-preferred connection AP list (647), and transmits data (649). Thereafter, when the UE reconnects to the 3GPP base station, the UE reports, to the base station, that the AP included in the non-preferred connection AP list is normally operating (651). The UE performs reporting to the base station using a message of the RRC layer and also using a BSSID to distinguish between APs.

Upon receiving the report, the base station updates AP lists that the base station manages (653). If there is a server managing APs, the base station may deliver, to the server 607, the list of improperly operating APs reported from the UE (655), and transmit, to UEs, the updated preferred connection AP list and non-preferred connection AP list such that the UEs connect to a connectable AP first. Thereby, unnecessary power consumption and connection delay may be prevented.

Figure 7:
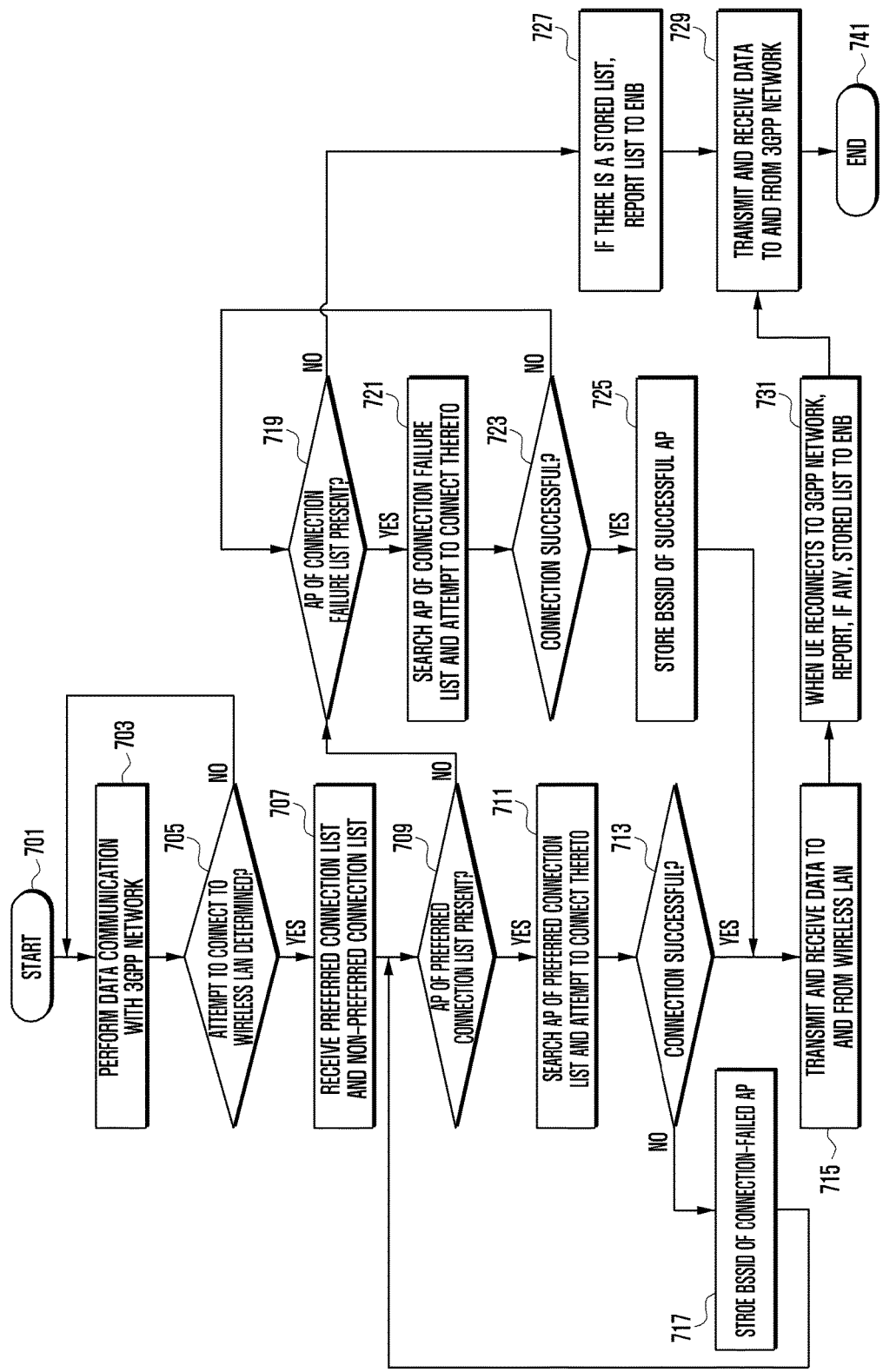
FIG. 7 is a flowchart illustrating an operational procedure of the user equipment according to the second embodiment of the present invention.

FIG. 7 is a flowchart illustrating an operational procedure of the UE according to the second embodiment of the present invention. For simplicity, the flowchart will be described based on embodiment 2-2.

In FIG. 7, the UE exchanges data with a 3GPP base station (703), and it is assumed that the UE operates in a connected mode in the 3GPP network. Thereafter, the UE determines to attempt to connection to the wireless LAN network for a reason such as user selection (705), and receives a preferred connection AP list and a non-preferred connection AP list from the base station (707).

If the received preferred connection AP list includes an AP to which the UE preferred has not attempted to connect (709), the UE searches the periphery of the UE for the AP. If there is an AP near the UE, the UE attempts to connect to the AP (711). If the connection is successful (713), the UE performs data communication with the wireless LAN AP to which connection has been successful (715).

If the UE successfully searches the APs included in the preferred connection AP list but fails to connect to some APs, the UE stores BSSIDs of the connection-failed APs (717). Thereafter, the UE attempts to connect to all searched APs included in the preferred connection AP list, but if the UE fails to connect to any of the APs, the UE determines if the non-preferred connection AP list includes an AP to which the UE has not attempted to connect (719). If the list includes APs to which the UE has not attempted to connect, the UE searches the periphery of the UE for APs. If there are APs near the UE, the UE attempts to connect to the APs (721). If connection is successful (723), the UE stores BSSIDs of APs which the UE has succeeded in connecting to (725), and performs data communication with wireless LAN APs (715).

If wireless LAN connection fails for all APs included in the preferred connection AP list and non-preferred connection AP list when the UE attempts to connect thereto, the UE reports, if there is any stored BSSID, a BSSID list to the base station (727), and performs data communication with the 3GPP network (729).

If the wireless LAN connection is successful, the UE performs data communication with the wireless LAN as described above (715). Thereafter, when the UE reconnects to the 3GPP network, the UE reports, if any, a stored BSSID list to the eNB (731) and performs data communication with the 3GPP network (729).

Figure 8:
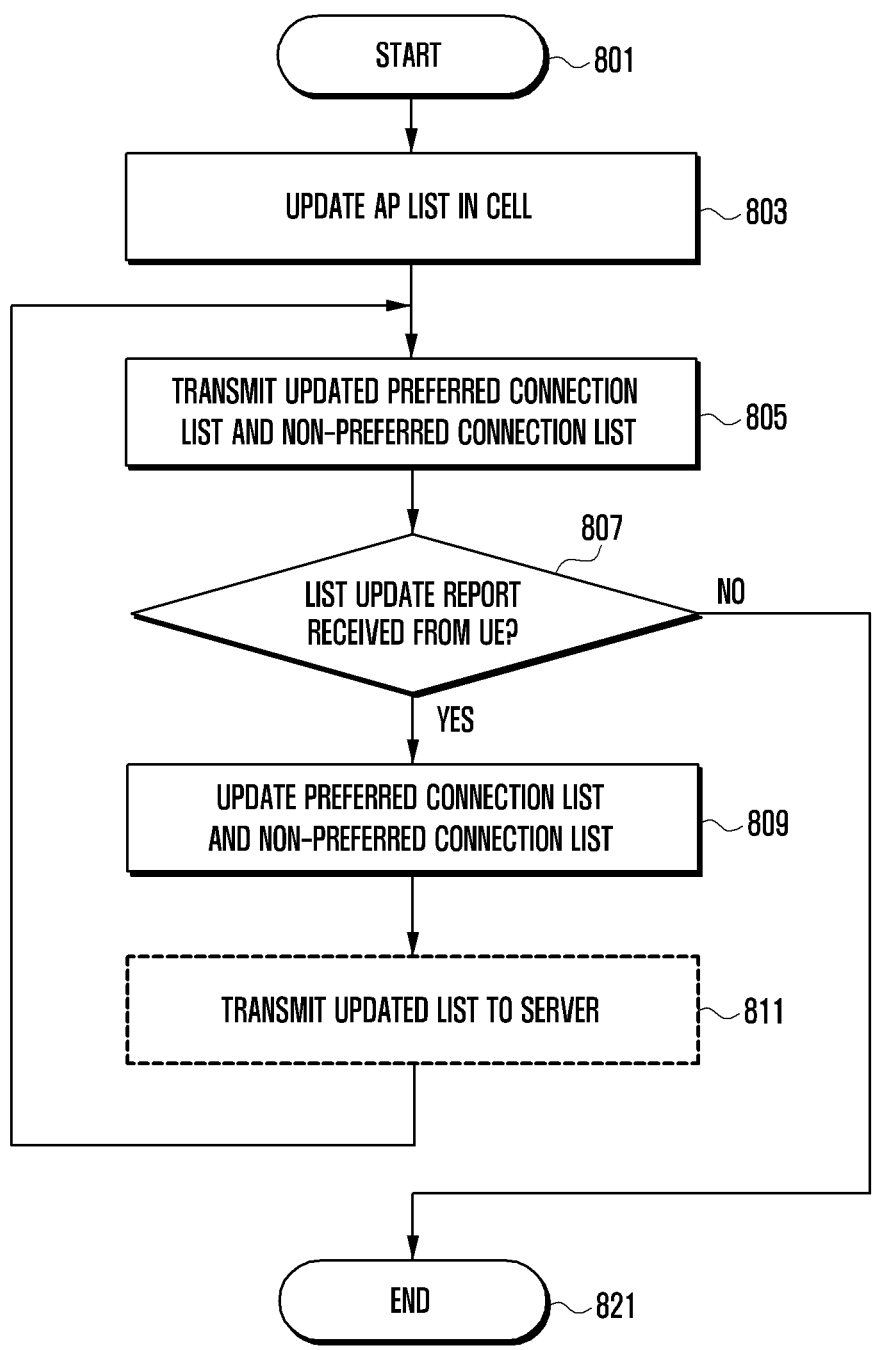
FIG. 8 is a flowchart illustrating an operational procedure of the base station according to the second embodiment of the present invention.

FIG. 8 is a flowchart illustrating an operational procedure of the eNB according to the second embodiment of the present invention. For simplicity, the flowchart will be described based on embodiment 2-2.

The eNB updates an AP list in the cell (803). As a method to update the AP list in the cell, the eNB may make a request to a specific UE for searching wireless LAN APs around the UE and receives a response message to the request, thereby updating the AP list.

The eNB transmits the updated preferred connection AP list and non-preferred connection AP list using the aforementioned method (805). Thereafter, if the eNB receives a list update report message from the UE (807), namely if the eNB receives, for example, a report on APs which have not been connected to among the APs included in the "preferred connection AP list" or the "non-preferred connection AP list", the eNB updates the retained preferred connection AP list and non-preferred connection AP list (809). If there is an AP management server in the 3GPP network, the eNB transmits the updated information to the server such that the server can have the updated information, and also transmits, to UEs in the cell, the updated preferred connection list and non-preferred connection list such that the UEs can connect to connectable APs first (805).

Figure 9:
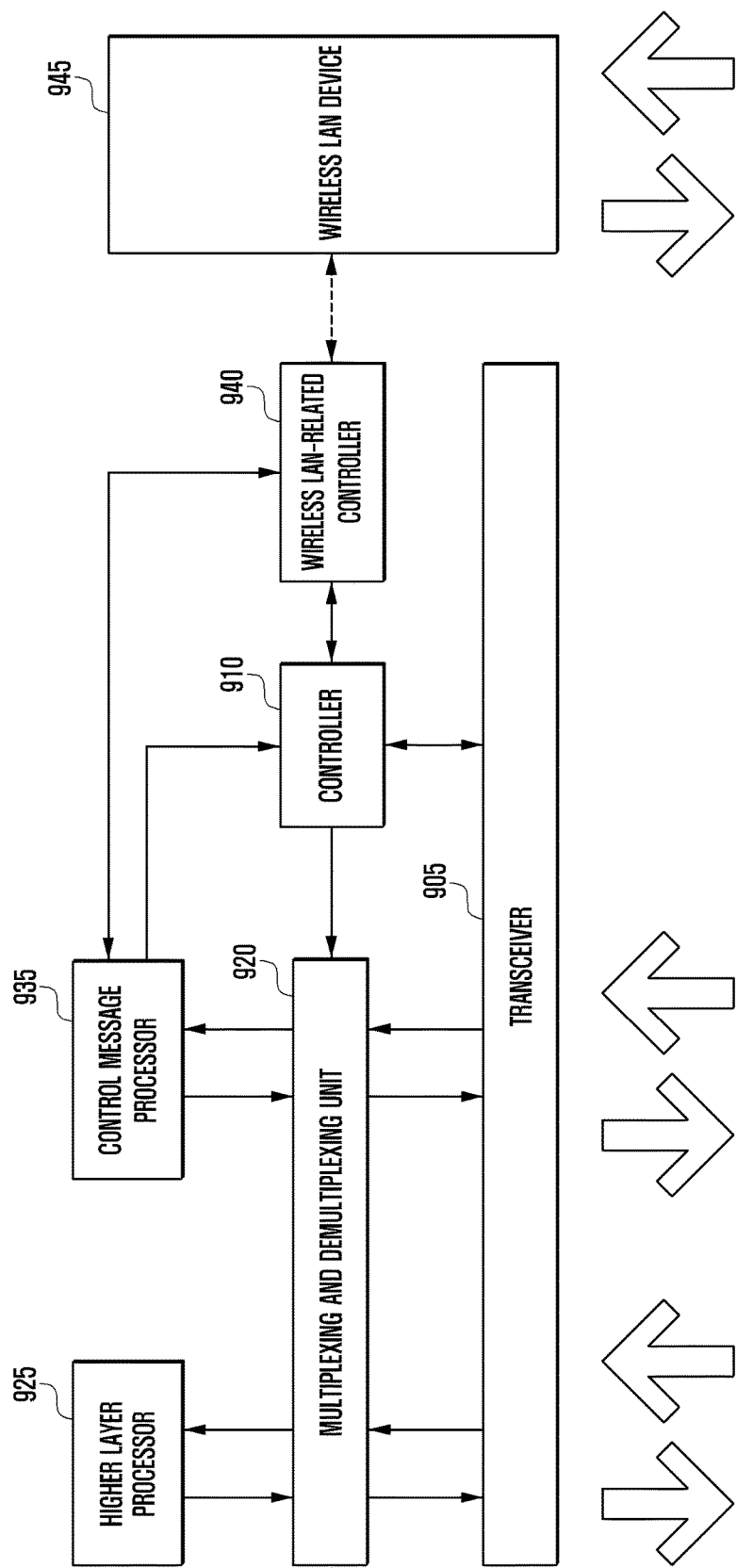
FIG. 9 illustrates configuration of a user equipment according to an embodiment of the present invention.

FIG. 9 illustrates configuration of a UE according to an embodiment of the present invention.

Referring to FIG. 9, a UE according to an embodiment of the present invention includes a transceiver 905, a controller 910, a multiplexing and demultiplexing unit 920, a control message processor 935 and a higher layer processor 925.

The transceiver 905 receives data and a predetermined control signal over a forward channel of a serving cell, and transmits data and a predetermined control signal over a reverse channel. When multiple serving cells are configured, the transceiver 905 performs communication of data and control signals through the multiple serving cells.

The multiplexing and demultiplexing unit 920 serves to multiplex data generated by the higher layer processor 925 or the control message processor 935 or to demultiplex data received from the transceiver 905 and then delivers the multiplexed or demultiplexed data to the higher layer processor 920 or the control message processor 935.

The control message processor 935 processes a control message received from the base station and performs a necessary operation. For example, if the control message processor 935 receives DRX-related parameters, the processor delivers the same to the controller.

The higher layer processor 920, which may be configured for each service, processes data generated in user services such as FTP (File Transfer Protocol) or VoIP (Voice over Internet Protocol) and delivers the processed data to the multiplexing and demultiplexing unit 920, or processes data delivered from the multiplexing and demultiplexing unit 920 and delivers the processed data to a service application of a higher layer.

The controller 910 checks a scheduling command received through the transceiver 905, for example, reverse grants, and controls the transceiver 905 and the multiplexing and demultiplexing unit 920 to perform reverse transmission on a proper transmission resource at a proper time. The controller also controls the transceiver in relation to a DRX operation and CSI/SRS transmission. In the present invention, it is assumed that a wireless LAN device 945 is provided in the UE. The control message processor 935 generates a message and sends the same to the cellular network such that a wireless LAN-related controller 940 proposed in the present invention signals, to the wireless LAN device 945, whether to search and select a wireless LAN according to information received from the cellular network, and receives, from the wireless LAN device 945, information on a wireless LAN AP to which the UE has successfully connected and reports the same to the cellular network.

Functions of the controller 910 are described in more detail below.

According to an embodiment, the controller 910 determines whether to attempt to connect to a mobile communication network during data communication over a wireless LAN. If the controller 910 determines to attempt to connect to the mobile communication network, the controller 910 determines whether to receive a connection restriction parameter from the base station. If the controller 910 determines to receive the connection restriction parameter, the controller 910 receives the connection restriction parameter from the base station and determines whether connection to the base station is allowed, based on the received connection restriction parameter. If the connection is allowed, the controller 910 may control attempting to connect to the base station.

In this case, the connection restriction parameter may include at least one of a connection prohibition indication bit, a bitmap according to the access class of the UE and a bitmap according to the connection type of the UE.

Further, once the UE is connected to the wireless LAN, the controller 910 determines to receive the connection restriction parameter if the wireless LAN intensity of the UE is greater than or equal to a preset intensity, or the UE is allowed to connect to the Internet.

According to another embodiment, the controller 910 receives connectable access point (AP) list information from the base station, and controls searching of neighboring APs, based on the received connectable AP list. Then, the controller 910 transmits, to the base station, a list of connection failure APs to which the UE has failed to connect among the searched APs, and receives, from the base station, a connection-related AP list updated based on the connection failure AP list. Then, the controller 910 may attempt to connect to a wireless LAN according to the received connection-related AP list. In this case, the connection-related AP list may be a connection prohibition list or a preferred connection AP list/non-preferred connection AP list.

Figure 10:
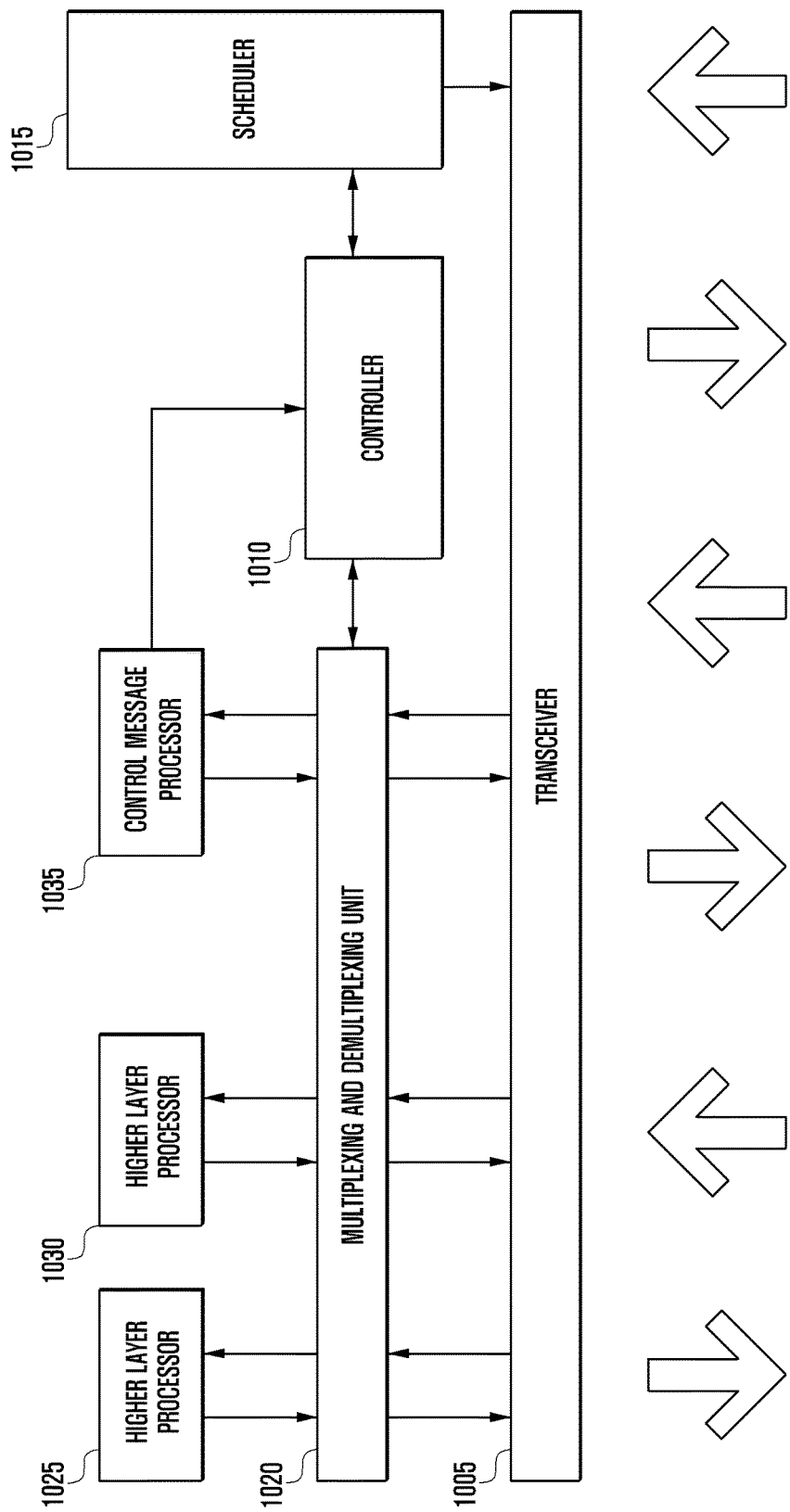
FIG. 10 illustrates configuration of a base station according to an embodiment of the present invention.

FIG. 10 illustrates configuration of a base station according to an embodiment of the present invention. The base station of FIG. 10 includes a transceiver 1005, a controller 1010, a multiplexing and demultiplexing unit 1020, a control message processor 1035, higher layer processors 1025 and 1030, and a scheduler 1015.

The transceiver 1005 transmits data and a predetermined control signal through a forward carrier and receives data and a predetermined control signal through a reverse carrier. When multiple carriers are configured, the transceiver 1005 transmits and receives data and control signals through the multiple carriers.

The multiplexing and demultiplexing unit 1020 serves to multiplex data generated by the higher layer processors 1025 and 1030 or the control message processor 1035 or to demultiplex data received from the transceiver 1005 and then delivers the same to the higher layer processors 1025 and 1030, the control message processor 1035 or the controller 1010. The control message processor 1035 processes a control message transmitted from the UE and performs a necessary operation, or generates a control message to be delivered to the UE and delivers the same to a lower layer.

The higher layer processors 1025 and 1030, which may be configured for each UE or service, process data generated in user services such as FTP or VoIP and deliver the processed data to the multiplexing and demultiplexing unit 1020, or process data delivered from the multiplexing and demultiplexing unit 1020 and deliver the processed data to a service application of a higher layer.

The controller 1010 controls the transceiver by determining when the UE will transmit CSI/SRS.

According to an embodiment of the present invention, the controller 1010 determines whether to control connection of a UE connected to a wireless LAN. If the controller 1010 determines to control the connection, the controller 1010 may configure a connection restriction parameter. Then, the controller 1010 may control transmitting the configured connection restriction parameter to the UE.

The scheduler 1015 allocates a transmission resource to the UE at a proper time in consideration of the buffer status and channel status of the UE, and causes the transceiver to process a signal transmitted from the UE or to transmit a signal to the UE.

With the proposed method, a cellular network controls connection of a UE when the UE attempts to connect thereto from a wireless LAN network. Thereby, the cellular network may be prevented from being overloaded. In addition, as the network delivers a valid wireless LAN AP list to UEs, unnecessary power consumption of the UEs and connection delay may be prevented.

Although specific embodiments of the present invention have been described above, those skilled in the art will appreciate that various modifications and variations can be made in the present invention without departing from the spirit or scope of the invention. Therefore, the above embodiments should be construed in all aspects as illustrative and not restrictive. The scope of the invention should be determined by the appended claims and their legal equivalents.

What is claimed is:

1. A method for connecting to a wireless local area network (LAN) access point by a terminal in a wireless communication system, the method comprising:
    receiving information on a connectable access point (AP) list from a base station;
    searching neighboring APs according to the received connectable AP list and transmitting, to the base station, a connection failure list of APs which the terminal has failed to connect to among the searched APs;
    receiving, from the base station, a connection-related AP list updated based on the connection failure AP list; and
    attempting to connect to a wireless LAN according to the received connection-related AP list.

2. The method of claim 1, wherein the connection-related AP list is a connection prohibition list including APs to which the terminal has failed to connect.

3. The method of claim 1,
    wherein the connection-related AP list comprises a preferred connection AP list and a non-preferred connection AP list, and
    wherein the terminal attempts to connect to APs in the preferred connection AP list first.

4. The method of claim 3, further comprising:
    transmitting, when the terminal succeeds in connecting to an AP included in the non-preferred connection AP list, information on the AP in the non-preferred connection AP list to the base station.

5. The method of claim 3, wherein the connection failure AP list sorts the APs based on a basic service set identifier.

6. A terminal connecting to a wireless local area network (LAN) access point in a wireless communication system, comprising:
    a transceiver configured to transmit and receive a signal; and
    a controller configured to:
        receive, via the transceiver, information on a connectable access point (AP) list from a base station;
        search neighboring APs according to the received connectable AP list and transmit, via the transceiver, to the base station, a connection failure list of APs to which the terminal has failed to connect among the searched APs;
        receive, via the transceiver, a connection-related AP list updated based on the connection failure AP list from the base station; and
        attempt to connect to a wireless LAN according to the received connection-related AP list.

7. The terminal of claim 6, wherein the connection-related AP list is a connection prohibition list including APs to which the terminal has failed to connect.

8. The terminal of claim 6,
    wherein the connection-related AP list comprises a preferred connection AP list and a non-preferred connection AP list, and
    wherein the controller is further configured to attempt to connect to APs in the preferred connection AP list first.

9. The terminal of claim 8, wherein, when the terminal succeeds in connecting to an AP included in the non-preferred connection AP list, the controller is further configured to control transmission of information on the AP in the non-preferred connection AP list to the base station.

10. The terminal of claim 6, wherein the connection failure AP list sorts the APs based on a basic service set identifier.

* * * * *